United States Patent
Li et al.

(10) Patent No.: US 9,584,242 B2
(45) Date of Patent: Feb. 28, 2017

(54) DATA TRANSMISSION METHOD BASED ON CROSS-CARRIER SCHEDULING, USER EQUIPMENT, AND BASE STATION

(71) Applicant: Huawei Device Co., Ltd., Shenzhen (CN)

(72) Inventors: Yingyang Li, Shenzhen (CN); Lei Guan, Beijing (CN); Bo Li, Beijing (CN)

(73) Assignee: Huawei Device Co., Ltd., Shenzhen (CN)

( * ) Notice: Subject to any disclaimer, the term of this patent is extended or adjusted under 35 U.S.C. 154(b) by 276 days.

(21) Appl. No.: 14/145,078

(22) Filed: Dec. 31, 2013

(65) Prior Publication Data
US 2014/0112219 A1 Apr. 24, 2014

Related U.S. Application Data

(63) Continuation of application No. PCT/CN2013/070749, filed on Jan. 21, 2013.

(30) Foreign Application Priority Data

Jan. 20, 2012 (CN) .......................... 2012 1 0018938

(51) Int. Cl.
*H04J 3/16* (2006.01)
*H04W 72/12* (2009.01)
(Continued)

(52) U.S. Cl.
CPC .......... *H04J 3/1694* (2013.01); *H04L 1/1854* (2013.01); *H04L 1/1887* (2013.01);
(Continued)

(58) Field of Classification Search
CPC ...................................................... H04J 3/16
See application file for complete search history.

(56) References Cited

U.S. PATENT DOCUMENTS 8,374,212 B2 * 2/2013 Charbit ................. H04B 1/715
375/132
9,042,312 B2 * 5/2015 Zhang ................. H04L 1/1822
370/322
(Continued)

FOREIGN PATENT DOCUMENTS

CN 101959319 A 1/2001
CN 102075949 A 5/2011
(Continued)

OTHER PUBLICATIONS

"3rd Generation Partnership Project; Technical Specification Group Radio Access Network; Evolved Universal Terrestrial Radio Access (E-UTRA); Physical layer procedures (Release 9)", 3GPP TS 36.213 v9.3.0, Sep. 2010, 80 pages.
(Continued)

*Primary Examiner* — Rasheed Gidado (57) ABSTRACT

Embodiments of the present invention provide a data transmission method based on cross-carrier scheduling. The method includes: determining a first downlink subframe according to a timing relationship of an uplink HARQ of a reference uplink and downlink configuration, where the first downlink subframe is used to indicate timing of sending uplink scheduling grant information of a first uplink subframe of a scheduled cell; transmitting the uplink scheduling grant information in a subframe of a scheduling cell corresponding to the first downlink subframe, under a circumstance that the subframe of the scheduling cell corresponding to the first downlink subframe is a downlink subframe, where an uplink and downlink configuration of the scheduling cell and an uplink and downlink configuration of the scheduled cell are different; and receiving or sending uplink data in the first uplink subframe. In the present invention, the cross-carrier scheduling may be implemented effectively.

19 Claims, 4 Drawing Sheets

(51) Int. Cl.
*H04L 1/18* (2006.01)
*H04L 5/00* (2006.01)
*H04W 72/04* (2009.01)
*H04L 5/14* (2006.01)

(52) U.S. Cl.
CPC ............ *H04L 1/1893* (2013.01); *H04L 5/001* (2013.01); *H04W 72/12* (2013.01); *H04L 1/1812* (2013.01); *H04L 5/0055* (2013.01); *H04L 5/1469* (2013.01); *H04W 72/0426* (2013.01)

(56) References Cited

U.S. PATENT DOCUMENTS

| | | | |
|---|---|---|---|
| 9,113,494 B2* | 8/2015 | Wang | H04W 72/1289 |
| 9,191,180 B2* | 11/2015 | Seo | H04L 1/1822 |
| 9,351,185 B2* | 5/2016 | Charbit | H04W 24/10 |
| 2011/0255489 A1 | 10/2011 | Zhang et al. | |
| 2011/0261714 A1* | 10/2011 | Pan | H04L 5/001 370/252 |
| 2012/0257554 A1* | 10/2012 | Kim | H04L 5/001 370/280 |
| 2013/0034028 A1* | 2/2013 | Chen | H04L 1/1854 370/280 |
| 2013/0034029 A1* | 2/2013 | Lee | H04L 1/1861 370/280 |
| 2013/0279377 A1 | 10/2013 | Zhao et al. | |
| 2013/0294423 A1* | 11/2013 | Wang | H04N 21/2365 370/336 |
| 2014/0177491 A1 | 6/2014 | Hao et al. | |

FOREIGN PATENT DOCUMENTS

| | | |
|---|---|---|
| CN | 102158978 A | 8/2011 |
| CN | 102263627 A | 11/2011 |
| CN | 102355731 A | 2/2012 |

OTHER PUBLICATIONS

"3rd Generation Partnership Project; Technical Specification Group Radio Access Network; Evolved Universal Terrestrial Radio Access (E-UTRA); Physical layer procedures (Release 8)", 3GPP TS 36.213 v8.8.0, Sep. 2009, 77 pages.

"3rd Generation Partnership Project; Technical Specification Group Radio Access Network; Evolved Universal Terrestrial Radio Access (E-UTRA); Physical layer procedures (Release 10)", 3GPP TS 36.213 v10.4.0, Dec. 2011, 125 pages.

"3rd Generation Partnership Project; Technical Specification Group Radio Access Network; Evolved Universal Terrestrial Radio Access (E-UTRA); Physical layer procedures (Release 11)", 3GPP TS 36.213 v11.4.0, Sep. 2013, 182 pages.

"HARQ Procedure for Full Duplex Mode in CC specific TDD configuration", Renesas Mobile Europe Ltd., 3GPP TSG-RAN WG1 Meeting #67, Nov. 14-18, 2011, 6 pages.

"DL/UL HARQ-ACK timing in CA with different TDD UL-DL configurations", Samsung, 3GPP TSG RAN WG1 #67, Nov. 14-18, 2011, 4 pages.

"HARQ timing design for TDD inter-band CA with different UL-DL configurations", Huawei, HiSilicon, 3GPP TSG RAN WG1 Meeting #67, Nov. 14-18, 2011, 5 pages.

"Discussion on Different TDD UL-DL Configurations in CA", Texas Instruments, 3GPP TSG RAN WG1 #67, Nov. 14-18, 2011, 4 pages.

* cited by examiner

DATA TRANSMISSION METHOD BASED ON CROSS-CARRIER SCHEDULING, USER EQUIPMENT, AND BASE STATION

CROSS-REFERENCE TO RELATED APPLICATIONS

This application is a continuation of International Application No. PCT/CN2013/070749, filed on Jan. 21, 2013, which claims priority to Chinese Patent Application No. 201210018938.7, filed on Jan. 20, 2012, both of which are hereby incorporated by reference in their entireties.

TECHNICAL FIELD

Embodiments of the present invention relate to the field of communications technologies, and in particular, to a data transmission method based on cross-carrier scheduling, a user equipment, and a base station.

BACKGROUND

In an LTE (Long Term Evolution) system, the smallest time interval for a base station to schedule a user equipment is a subframe. Data transmission in an uplink direction is based on a policy of a synchronous (hybrid automatic repeat request, Hybrid Automatic Repeat reQuest) HARQ. Specifically, the base station sends uplink scheduling grant (Uplink_ grant, UL_grant) information in a downlink subframe to schedule a physical uplink shared channel (Physical Uplink Shared Channel, PUSCH) in a certain subsequent uplink subframe; the user equipment (User Equipment, UE) sends the PUSCH according to the UL_grant; the base station receives the PUSCH, and sends feedback information (ACK or NACK) of the PUSCH, that is, physical HARQ indicator channel (Physical HARQ Indicator Channel, PHICH) information, at fixed timing, and negative PHICH information (that is, NACK) triggers PUSCH retransmission in a subsequent uplink subframe. Herein, after the base station schedules a PUSCH, timing of retransmitting a PHICH corresponding to the PUSCH and the PUSCH is fixed.

In LTE release 10, a carrier aggregation (Carrier Aggregation, CA) technology is introduced, so as to increase a peak rate of a system by supporting data sending on multiple carriers simultaneously. Two methods for scheduling uplink data, that is, non-cross-carrier scheduling and cross-carrier scheduling, are introduced in the LTE release 10. Because in the release 10, it is supposed that a primary cell (Pcell) and a secondary cell (Scell) adopting the CA technology adopt the same time division duplexing (Time Division Duplexing, TDD) uplink and downlink configuration, in the two scheduling policies, the primary cell and the secondary cell may work according to a timing relationship of an HARQ in an uplink and downlink configuration defined in an LTE release 8. For the non-cross-carrier scheduling, the UL_grant and the PHICH used to schedule a PUSCH of the Scell are sent by the Scell; and for the cross-carrier scheduling, the UL_grant and the PHICH used to schedule a PUSCH of the Scell are sent by the Pcell.

In LTE release 11, for a TDD system, it is necessary to study how to process different uplink and downlink configurations of multiple cells adopting the CA technology are different. For example, the PCell adopts an uplink and downlink configuration 1, and the SCell adopts an uplink and downlink configuration 2. For some subframes, a duplexing direction of the PCell and a duplexing direction of the SCell are consistent, for example, subframes 0 of the two cells are downlink subframes, and subframes 2 of the two cells are uplink subframes; however, for some special subframes, for example, a subframe 3 and a subframe 8, duplexing directions of the two cells are different.

For the foregoing circumstance that the uplink and downlink configurations of the two cells adopting the CA technology are different, if the non-cross-carrier scheduling is adopted, scheduling of PUSCH transmission of the Scell may still be performed according to timing of an uplink HARQ of the Scell. However, in the case of cross-carrier scheduling, because the UL_grant and the PHICH need to be sent by the Pcell, and a subframe of the Pcell used for timing for scheduling the PUSCH may be an uplink subframe, where and the timing is obtained according to a certain timing policy. The uplink subframe is incapable of supporting the cross-carrier scheduling of the PUSCH of the Scell, thereby failing to effectively implement the cross-carrier scheduling.

SUMMARY

Embodiments of the present invention provide a data transmission method based on cross-carrier scheduling, a user equipment, and a base station, capable of effectively implementing cross-carrier scheduling under a circumstance that uplink and downlink configurations of two cells adopting carrier aggregation are different.

According to one aspect, a data transmission method based on cross-carrier scheduling is provided, which includes: determining a first downlink subframe according to a timing relationship of an uplink hybrid automatic repeat request HARQ of a reference uplink and downlink configuration, where the first downlink subframe is used to indicate timing of sending uplink scheduling grant information of a first uplink subframe of a scheduled cell; transmitting the uplink scheduling grant information in a subframe of a scheduling cell corresponding to the first downlink subframe, under a circumstance that the subframe of the scheduling cell corresponding to the first downlink subframe is a downlink subframe, where an uplink and downlink configuration of the scheduling cell and an uplink and downlink configuration of the scheduled cell are different; and transmitting uplink data in the first uplink subframe.

According to another aspect, a base station is provided, which includes: a processor, configured to determine a first downlink subframe according to a timing relationship of an uplink hybrid automatic repeat request HARQ of a reference uplink and downlink configuration, where the first downlink subframe is used to indicate timing of sending uplink scheduling grant information of a first uplink subframe of a scheduled cell; a sender, configured to send the uplink scheduling grant information in a subframe of a scheduling cell corresponding to the first downlink subframe, under a circumstance that the subframe of the scheduling cell corresponding to the first downlink subframe is a downlink subframe, where an uplink and downlink configuration of the scheduling cell and an uplink and downlink configuration of the scheduled cell are different; and a receiver, configured to receive uplink data sent in the first uplink subframe by a user equipment.

According to further another aspect, a user equipment is provided, which includes: a processor, configured to determine a first downlink subframe according to a timing relationship of an uplink hybrid automatic repeat request HARQ of a reference uplink and downlink configuration, where the first downlink subframe is used to indicate timing of sending uplink scheduling grant information of a first uplink subframe of a scheduled cell; a receiver, configured to receive the uplink scheduling grant information in a subframe of a scheduling cell corresponding to the first downlink subframe, under a circumstance that the subframe of the scheduling cell corresponding to the first downlink subframe is a downlink subframe, where an uplink and downlink configuration of the scheduling cell and an uplink and downlink configuration of the scheduled cell are different; and a sender, configured to send uplink data in the first uplink subframe according to the uplink scheduling grant information.

According to still another aspect, a communications system is provided, which includes: the foregoing base station and the foregoing user equipment.

According to the technical solutions, a downlink subframe used to perform cross-carrier scheduling on a subframe of a scheduled cell is determined according to a timing relationship of an uplink HARQ of a reference uplink and downlink configuration, and under a circumstance that a subframe of a scheduling cell corresponding to the downlink subframe is a downlink subframe, the cross-carrier scheduling is performed on the subframe of the scheduled cell, thereby effectively implementing the cross-carrier scheduling under a circumstance that an uplink and downlink configuration of the scheduling cell and an uplink and downlink configuration of the scheduled cell are different.

BRIEF DESCRIPTION OF THE DRAWINGS

To describe the technical solutions in the embodiments of the present invention more clearly, the following briefly introduces the accompanying drawings required for describing the embodiments. Apparently, the accompanying drawings in the following description show merely some embodiments of the present invention, and a person of ordinary skill in the art may still derive other drawings from these accompanying drawings without creative efforts.

DETAILED DESCRIPTION

The following clearly describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

It should be understood that, technical solutions of the present invention may be applied to various communications systems, such as: Global System of Mobile Communication (GSM, Global System of Mobile Communication) system, a Code Division Multiple Access (CDMA, Code Division Multiple Access) system, Wideband Code Division Multiple Access (WCDMA, Wideband Code Division Multiple Access) system, a general packet radio service (GPRS, General Packet Radio Service), Long Term Evolution (LTE, Long Term Evolution) system, Advanced Long Term Evolution (LTE-A, Advanced Long Term Evolution) system, Universal Mobile Telecommunications System (UMTS, Universal Mobile Telecommunications System), and the like, which is not limited in embodiments of the present invention. However, for ease of description, the embodiments of the present invention are described by using an LTE network as an example.

The embodiments of the present invention may be applied to wireless networks with different standards. In different systems, a radio access network may include different network elements. For example, network elements of a radio access network in the LTE (Long Term Evolution, Long Term Evolution) and the LTE-A (Advanced long term evolution, Advanced Long Term Evolution) include an eNB (eNodeB, evolved base station), network elements of a radio access network in the WCDMA (Wideband Code Division Multiple Access, Wideband Code Division Multiple Access) include an RNC (Radio Network Controller, radio network controller) and a NodeB; similarly, other wireless networks, such as WiMAX (Worldwide Interoperability for Microwave Access, Worldwide Interoperability for Microwave Access), may also use a solution similar to the embodiments of the present invention, but related modules in a base station system may be different, which is not limited in the embodiments of the present invention. However, for ease of description, the embodiments in the following are described by using the eNodeB as an example.

It should be further understood that, in the embodiments of the present invention, a user equipment (UE, User Equipment) includes, but is not limited to, a mobile station (MS, Mobile Station), a mobile terminal (Mobile Terminal), a mobile telephone (Mobile Telephone), a handset (handset), portable equipment (portable equipment), and the like. The user equipment may communicate with one or more core networks through a radio access network (RAN, Radio Access Network), for example, the user equipment may be a mobile phone (or called a "cellular" phone), a computer having a radio communications function, and the like, and the user equipment may further be a portable, pocket, hand-held, computer built-in, or vehicle-mounted mobile apparatus.

According to the embodiments of the present invention, concepts of a scheduling cell and a scheduled cell are introduced. A cell sending UL_grant information and a PHICH is referred to as the scheduling cell, and a cell sending a PUSCH is referred to as the scheduled cell. According to the embodiments of the present invention, a method of the present invention is described by using one scheduling cell and one scheduled cell as an example. It should be understood that, the embodiments of the present invention may be directly extended to the case of one scheduling cell and multiple scheduled cells. For a system that has only two cells and adopts a CA technology, the scheduling cell corresponds to a primary cell adopting the CA technology, and the scheduled cell corresponds to a secondary cell adopting the CA technology. However, for a system that has more than two cells and adopts the CA technology, the scheduling cell may correspond to the primary cell, or correspond to the secondary cell, the scheduled cell corresponds to the secondary cell, and there may be multiple scheduling cells and scheduled cells.

Embodiment 1

Figure 1:
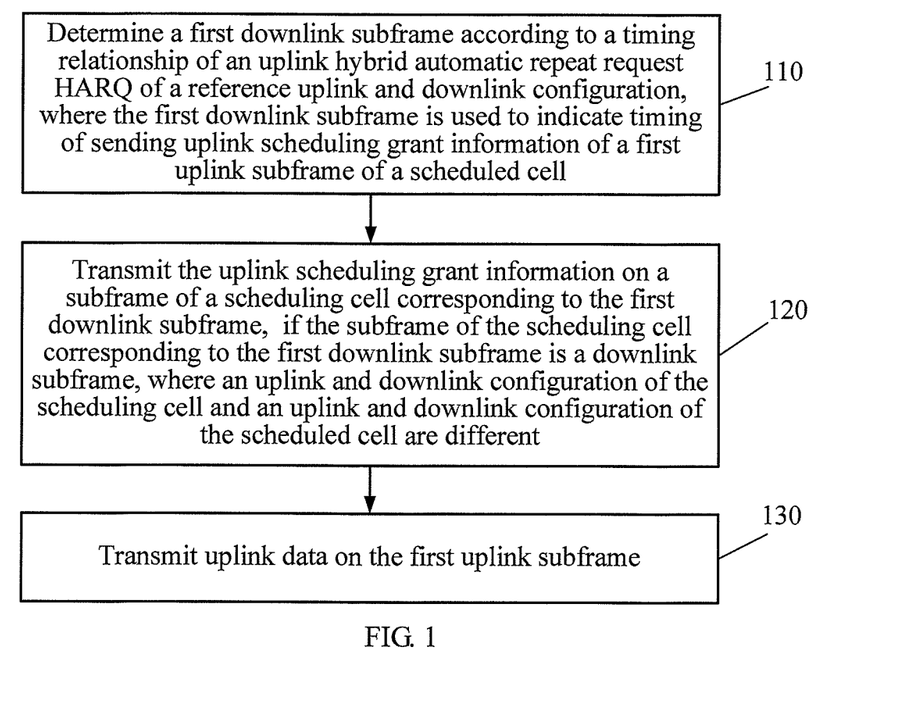
FIG. 1 is a schematic flowchart of a data transmission method based on cross-carrier scheduling according to Embodiment 1 of the present invention.

FIG. 1 is a schematic flowchart of a data transmission method based on cross-carrier scheduling according to Embodiment 1 of the present invention. The method of FIG. 1 may be executed by a base station or a UE.

110: Determine a first downlink subframe according to a timing relationship of an uplink hybrid automatic repeat request HARQ of a reference uplink and downlink configuration, where the first downlink subframe is used to indicate timing of sending uplink scheduling grant information of a first uplink subframe of a scheduled cell.

For example, for each combination of an uplink and downlink configuration of a scheduling cell and an uplink and downlink configuration of a scheduled cell, PUSCH transmission of the scheduled cell may be processed by using timing of an uplink HARQ of a certain kind of uplink and downlink configuration that is already defined in an LTE release 8, and the multiplexed uplink and downlink configuration is referred to as a reference uplink and downlink configuration. The reference uplink and downlink configuration may be the uplink and downlink configuration of the scheduling cell or the uplink and downlink configuration of the scheduled cell, or may be another uplink and downlink configuration different from the uplink and downlink configuration of the scheduling cell and the uplink and downlink configuration of the scheduled cell. The reference uplink and downlink configuration may be notified by using high-layer signaling, that is, the UE is notified by adopting broadcast signaling or radio resource control (RRC, Radio Resource Control) signaling, which is not limited in the embodiment of the present invention, for example, the reference uplink and downlink configuration may also be predefined or preconfigured, and does not need to be notified by using the signaling, thereby reducing signaling overheads.

For example, the LTE release 8 defines the timing relationship of the uplink HARQ for seven kinds of uplink and downlink configurations (uplink and downlink configurations 0, 1, 2, 3, 4, 5, and 6). The timing relationship of the uplink HARQ is used to indicate timing of the uplink scheduling grant information of the uplink subframe, timing of the uplink subframe, timing of feedback information of the uplink subframe, and timing of retransmitting the uplink subframe, that is, that the uplink scheduling grant information of the uplink subframe is sent in which downlink subframe, the PUSCH of the uplink subframe is sent in which uplink subframe, the feedback information of the uplink subframe is sent in which downlink subframe, and the PUSCH of the uplink subframe is retransmitted in which uplink subframe. According to the embodiment of the present invention, the base station or the UE may determine timing of the cross-carrier scheduling of the scheduled cell according to the timing relationship of the uplink HARQ of the reference uplink and downlink configuration.

120: Transmit the uplink scheduling grant information in a subframe of the scheduling cell corresponding to the first downlink subframe, under a circumstance that the subframe of the scheduling cell corresponding to the first downlink subframe is a downlink subframe, where the uplink and downlink configuration of the scheduling cell and the uplink and downlink configuration of the scheduled cell are different.

For example, because the uplink and downlink configuration of the scheduling cell and the uplink and downlink configuration of the scheduled cell are different, a circumstance that the subframe of the scheduling cell corresponding to the first downlink subframe is an uplink subframe may exist. In this case, the cross-carrier scheduling is not allowed to be performed on the first uplink subframe of the scheduled cell, because the uplink subframe of the scheduling cell cannot be used to send the uplink scheduling grant information to the UE. In other words, only under the circumstance that the subframe of the scheduling cell corresponding to the first downlink subframe is the downlink subframe, the cross-carrier scheduling is allowed to be performed on the first uplink subframe of the scheduled cell. Optionally, under the circumstance that the subframe of the scheduling cell corresponding to the first downlink subframe is the uplink subframe, non-cross-carrier scheduling may be performed on the first uplink subframe of the scheduled cell or the first uplink subframe of the scheduled cell is not used to perform the PUSCH transmission.

For example, the base station may send the uplink scheduling grant information in the subframe of the scheduling cell corresponding to the first downlink subframe, and the UE may receive the uplink scheduling grant information in the subframe of the scheduling cell corresponding to the first downlink subframe.

130: Transmit uplink data in the first uplink subframe.

For example, the UE may send the PUSCH in the first uplink subframe, and the base station may receive the PUSCH in the first uplink subframe.

According to Embodiment 1 of the present invention, the downlink subframe used to perform the cross-carrier scheduling on the subframe of the scheduled cell is determined according to the timing relationship of the uplink HARQ of the reference uplink and downlink configuration, and under the circumstance that the subframe of the scheduling cell corresponding to the downlink subframe is the downlink subframe, the cross-carrier scheduling is performed on the subframe of the scheduled cell, thereby effectively implementing the cross-carrier scheduling under the circumstance that the uplink and downlink configuration of the scheduling cell and the uplink and downlink configuration of the scheduled cell are different.

According to Embodiment 1 of the present invention, a method for supporting the cross-carrier scheduling of the scheduled cell may be obtained. To reasonably select the reference uplink and downlink configuration to further improve system performance, and avoid a problem in a synchronous HARQ operation, according to the embodiment of the present invention, other design principles are further considered to obtain a cross-carrier scheduling method with better performance.

According to Embodiment 1 of the present invention, the reference uplink and downlink configuration allows performing the cross-carrier scheduling on at least one uplink subframe of the scheduled cell according to the timing relationship of the uplink HARQ of the reference uplink and downlink configuration.

According to Embodiment 1 of the present invention, the reference uplink and downlink configuration allows performing the cross-carrier scheduling on the at least one uplink subframe of the scheduled cell, under a circumstance that a subframe of the scheduling cell corresponding to a downlink subframe that is used to send uplink scheduling grant information of the at least one uplink subframe and determined according to the timing relationship of the uplink HARQ is a downlink subframe, a subframe of the scheduling cell corresponding to a downlink subframe that is used to send physical hybrid automatic repeat request indicator channel PHICH information and determined according to the timing relationship of the uplink HARQ is a downlink subframe, and a subframe of the scheduled cell corresponding to a downlink subframe that is used to retransmit uplink data of the at least one uplink subframe and determined according to the timing relationship of the uplink HARQ is an uplink subframe.

For example, according to Embodiment 1 of the present invention, when the reference uplink and downlink configuration is determined, the reference uplink and downlink configuration may be selected according to the configuration of the scheduling cell and the configuration of the scheduled cell, so as to ensure that the reference uplink and downlink configuration supports the cross-carrier scheduling on the at least one uplink subframe of the scheduled cell, for example, the at least one uplink subframe of the scheduled cell may find, according to the reference uplink and downlink configuration, in the scheduling cell, the downlink subframe used to send the uplink scheduling grant information, the downlink subframe used to send the feedback information, and the uplink subframe used for retransmission. If the cross-carrier scheduling is not supported by any uplink subframe of the scheduled cell, it may be implemented by configuring the UE and adopting an asymmetric CA mode, that is, CA is configured in downlink and a single cell is configured in uplink.

According to the embodiment of the present invention, the scheduling cell adopts one of uplink and downlink configurations 2 to 5 defined in the LTE release 8, and the uplink and downlink configuration of the scheduled cell serves as the reference uplink and downlink configuration.

For example, if that the uplink and downlink configuration of the scheduling cell and the uplink and downlink configuration of the scheduled cell are different, to support the cross-carrier scheduling for the scheduled cell based on the PUSCH transmission of a synchronous HARQ, the timing of the uplink HARQ of a certain uplink and downlink configuration already defined in the LTE release 8 may be multiplexed according to the embodiment of the present invention, so as to process the PUSCH transmission of the scheduled cell, thereby lowering complexity of standardization. For example, the uplink and downlink configuration of the scheduled cell may serve as the reference uplink and downlink configuration. In addition, for a combination of the uplink and downlink configuration of the scheduling cell and the uplink and downlink configuration of the scheduled cell, such reference uplink and downlink configuration may be selected, so as to perform the cross-carrier scheduling on as many uplink subframes of the scheduled cell as possible.

Optionally, as a supplement or an exception, the scheduling cell adopts an uplink and downlink configuration 0, an uplink and downlink configuration 1, or an uplink and downlink configuration defined in the LTE release 8, and the uplink and downlink configuration 1 serves as the reference uplink and downlink configuration.

For example, compared with using another uplink and downlink configuration as the reference uplink and downlink configuration, using the uplink and downlink configuration 1 as the reference uplink and downlink configuration may support the most uplink subframes of the scheduled cell on which the cross-carrier scheduling can be implemented.

According to Embodiment 1 of the present invention, the scheduling cell adopts one of uplink and downlink configurations 1 to 5 defined in the LTE release 8, and the uplink and downlink configuration of the scheduling cell serves as the reference uplink and downlink configuration.

For example, for each combination of the configuration of the scheduling cell and the configuration of the scheduled cell, the timing of the uplink HARQ of which reference uplink and downlink configuration is determined according to the uplink and downlink configuration of the scheduling cell to process the PUSCH transmission of the scheduled cell. In this case, when the method of notifying by using the signaling is adopted to configure the reference uplink and downlink configuration, as long as the scheduling cell (corresponding to the Pcell) remains unchanged, new signaling is not needed to notify the reference uplink and downlink configuration, thereby lowering signaling overheads.

Optionally, as a supplement or an exception, the scheduling cell adopts the uplink and downlink configuration 0 or the uplink and downlink configuration 6 defined in the LTE release 8, and the uplink and downlink configuration 1 defined in the LTE release 8 serves as the reference uplink and downlink configuration.

For example, compared with using another uplink and downlink configuration as the reference uplink and downlink configuration, using the uplink and downlink configuration 1 as the reference uplink and downlink configuration may support the most uplink subframes of the scheduled cell on which the cross-carrier scheduling can be implemented.

Optionally, as a supplement or an exception, the method of FIG. 1 further includes: determining a second downlink subframe according to the timing relationship of the uplink HARQ of the reference uplink and downlink configuration, where the second downlink subframe is used to indicate timing of transmitting PHICH information of the PUSCH; transmitting the PHICH information in a subframe of the scheduling cell corresponding to the second downlink subframe, under a circumstance that the subframe of the scheduling cell corresponding to the second downlink subframe is a downlink subframe, where in 120, the uplink scheduling grant information is transmitted in the subframe of the scheduling cell corresponding to the first downlink subframe, under the circumstance that the subframe of the scheduling cell corresponding to the second downlink subframe is the downlink subframe.

For example, according to Embodiment 1 of the present invention, it may be designed that the uplink subframe of the scheduled cell may be used for transmitting the PUSCH when meeting the following conditions. If it is not limited that an available PHICH defined in the LTE release 8 needs to exist in the scheduling cell, for the uplink subframe of one scheduled cell, timing of sending the UL_grant and the PHICH information may be determined according to an uplink timing relationship of the reference uplink and downlink configuration. If what in the two pieces of timing of the scheduling cell are downlink subframes, the cross-carrier scheduling may be performed on the uplink subframe of the scheduled cell. In other words, only when the uplink subframe of the scheduled cell finds, according to the timing relationship of the HARQ of the reference uplink and downlink configuration, in the scheduling cell, the downlink subframe used to send the uplink scheduling grant information, and the downlink subframe used to send the feedback information or the PHICH information, the cross-carrier scheduling may be performed on the uplink subframe of the scheduled cell.

According to Embodiment 1 of the present invention, if a PHICH used for multiple uplink subframes is defined in the second downlink subframe of the reference uplink and downlink configuration, and a PHICH is also defined in the subframe of the scheduling cell corresponding to the second downlink subframe, one of the multiple uplink subframes uses the PHICH defined in the subframe of the scheduling cell, or the multiple uplink subframes all use the PHICH defined in the subframe of the scheduling cell.

For example, under a circumstance that the scheduled cell adopts the uplink and downlink configuration 0 and the reference uplink and downlink configuration is the uplink and downlink configuration of the scheduled cell, PHICHs (such as, a PHICH 0 and a PHICH 1) in the synchronous HARQ procedure of the two uplink subframes are respectively defined in the subframe 0 or 5 of the uplink and downlink configuration 0. If the PHICH is also defined in the subframe 0 (or 5) of the scheduling cell, the PHICH of the subframe 0 (or 5) of the scheduling cell is used according to the synchronous HARQ procedure using the PHICH 0 or PHICH 1; or the PHICH of the subframe 0 (or 5) of the scheduling cell is used for both two synchronous HARQ procedures.

In 120, under a circumstance that the subframe of the scheduling cell corresponding to the second downlink subframe is the downlink subframe and the PHICH is defined, the uplink scheduling grant information is transmitted in the subframe of the scheduling cell corresponding to the first downlink subframe.

For example, if it is limited that the available PHICH defined in the LTE release 8 needs to exist in the scheduling cell, for the uplink subframe of one scheduled cell, timing of sending the PHICH is determined according to the uplink timing relationship of the reference uplink and downlink configuration. If what in the timing of the scheduling cell is a downlink subframe and the available PHICH defined in the LTE release 8 exists, the cross-carrier scheduling may be performed on the uplink subframe of the scheduled cell.

Optionally, as a supplement or an exception, the method in FIG. 1 further includes: determining a second uplink subframe according to the timing relationship of the uplink HARQ of the reference uplink and downlink configuration, where the second uplink subframe is used to indicate timing of retransmitting the PUSCH; retransmitting the PHICH in a subframe of the scheduled cell corresponding to the second downlink subframe, under a circumstance that the subframe of the scheduled cell corresponding to the second uplink subframe is an uplink subframe, where in 120, the uplink scheduling grant information is transmitted in the subframe of the scheduling cell corresponding to the first downlink subframe, under the circumstance that the subframe of the scheduled cell corresponding to the second uplink subframe is the uplink subframe.

For example, for the PUSCH of the uplink subframe of the scheduled cell, it is ensured that what in the subframe timing used when the PUSCH is retransmitted in the synchronous HARQ procedure is also an uplink subframe, thereby ensuring performance of the synchronous HARQ. Otherwise, if the downlink subframe is in one or more retransmitting locations, under a circumstance of such a combination of the configuration of the scheduling cell and the configuration of the scheduled cell, more time needs to be taken to wait before the PUSCH is retransmitted again. If the wait time is excessively long and exceeds a service tolerance range, it is actually equivalent to that the HARQ technology cannot be used to enhance transmission performance, thereby affecting link reliability.

According to Embodiment 1 of the present invention, for each kind of uplink and downlink configuration of the scheduled cell, a uniform method is adopted to process the PUSCH transmission of the scheduled cell. In other words, the PUSCH transmission of the scheduled cell is processed according to the timing of the uplink HARQ of the scheduling cell; or the PUSCH transmission of the scheduled cell is processed according to the timing of the uplink HARQ of the scheduled cell; or the PUSCH transmission of the scheduled cell is processed according to timing of an uplink HARQ of a certain fixed reference uplink and downlink configuration.

The embodiments of the present invention are described in more details in the following with reference to specific examples.

Embodiment 2

Figure 2:
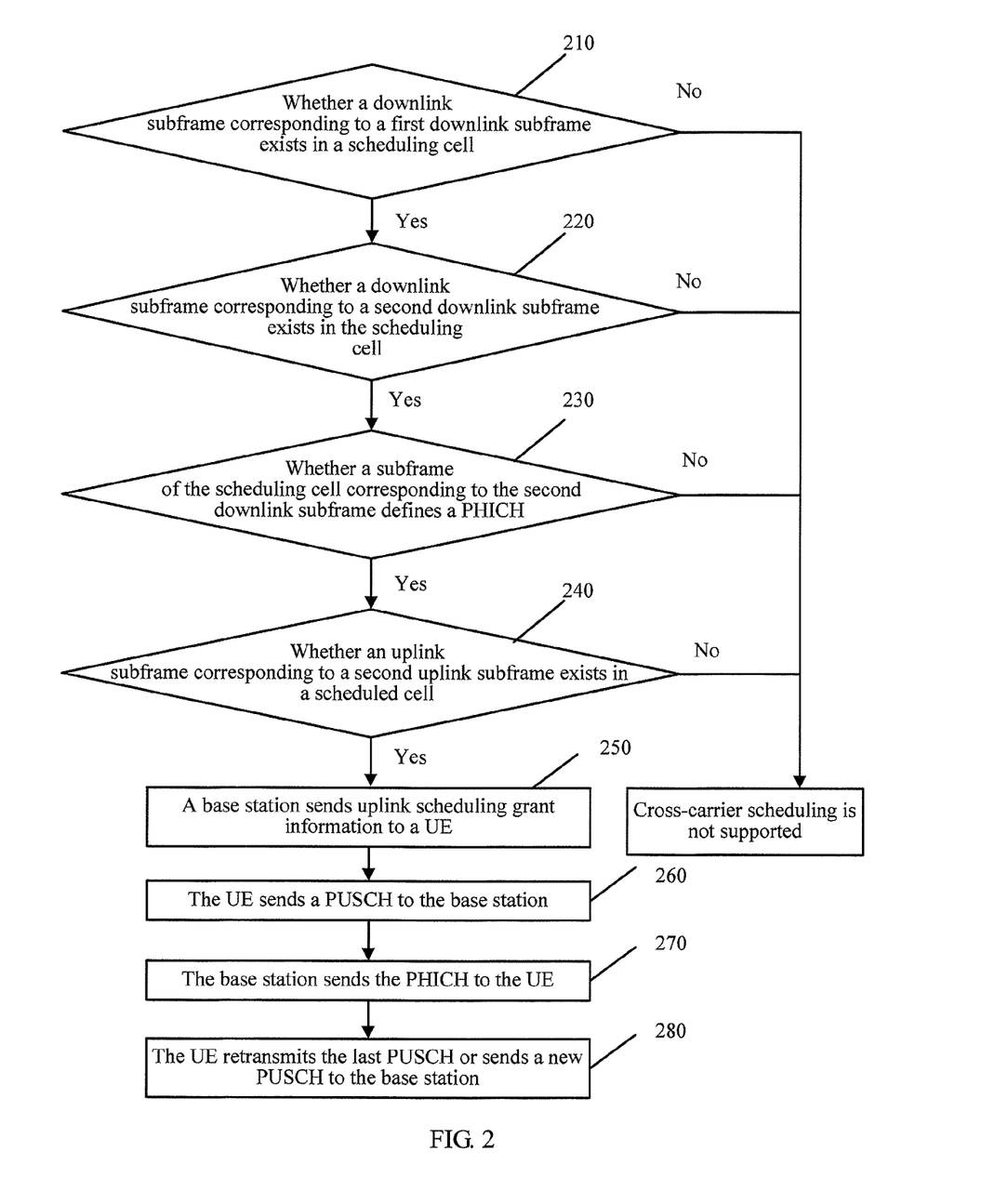
FIG. 2 is a schematic flowchart of a data transmission procedure based on cross-carrier scheduling according to Embodiment 2 of the present invention.

FIG. 2 is a schematic flowchart of a data transmission procedure based on cross-carrier scheduling according to Embodiment 2 of the present invention. Embodiment 2 describes one or more steps in the method of Embodiment 1 in details.

In Embodiment 2 of the present invention, a proper reference uplink and downlink configuration may be selected for different combinations of an uplink and downlink configuration of a scheduling cell and an uplink and downlink configuration of a scheduled cell according to specific requirements, for example, the uplink and downlink configuration that supports the most uplink subframes of the scheduled cell on which the cross-carrier scheduling can be implemented may be selected as the reference uplink and downlink configuration.

In the embodiment, the following limitation is considered: an available PHICH channel defined in an LTE release 8 definitely exists when synchronous HARQ transmission is performed in a PUSCH of the scheduled cell. Because a cycle of a frame structure of LTE is 10 ms, the PUSCH of the scheduled cell may be required to support only a retransmission cycle of 10 ms, so as to ensure that the uplink subframe definitely exist in a retransmission location of the PUSCH.

For each combination of the uplink and downlink configuration of the scheduling cell and the uplink and downlink configuration of the scheduled cell, the reference uplink and downlink configuration needs to be specified. If a method of notifying by using signaling is adopted to configure the reference uplink and downlink configuration, signaling overheads are high, because the adopted reference uplink and downlink configuration needs to be specified each time when a new scheduled cell is added to a UE adopting a CA mode. To lower complexity and the signaling overheads, according to the embodiment of the present invention, for each combination of the configuration of the scheduling cell and the configuration of the scheduled cell, it is determined, according to the uplink and downlink configuration of the scheduling cell, to use timing of an uplink HARQ of which reference uplink and downlink configuration to process the PUSCH transmission of the scheduled cell, which, however, is irrelevant to the uplink and downlink configuration adopted by the scheduled cell. If the method of notifying by using the signaling is adopted to configure the reference uplink and downlink configuration, as long as the scheduling cell (corresponding to the Pcell) remains unchanged, new signaling is not needed to notify the reference uplink and downlink configuration. Alternatively, signaling for configuring the reference uplink and downlink configuration is sent together with signaling for configuring the Pcell. If the method of notifying by using the signaling is not used, the reference uplink and downlink configuration corresponding to each kind of the uplink and downlink configuration of the scheduled cell may be determined according to the following method.

For example, when the scheduling cell adopts a certain configuration in uplink and downlink configurations 1 to 5, the uplink and downlink configuration of the scheduling cell serves as the reference uplink and downlink configuration, that is, the cross-carrier scheduling of the uplink subframe of the scheduled cell is supported according to the timing of the uplink HARQ of the scheduling cell. Specifically, for timing of the subframes that are uplink subframes in the scheduling cell and the scheduled cell, and for the uplink subframe of the scheduled cell, UL_grant information and PHICH information are sent according to the timing of the uplink HARQ of the scheduling cell; however, under a circumstance that what in the scheduled cell is the uplink subframe, and what in the scheduling cell in the same subframe timing is a downlink subframe, the cross-carrier scheduling is not supported for the uplink subframe in such a scheduled cell.

For example, when the scheduling cell adopts an uplink and downlink configuration 0 or 6, the uplink and downlink configuration 1 is always adopted to serve as the reference uplink and downlink configuration, that is, the cross-carrier scheduling is performed on the uplink subframe of the scheduled cell according to the timing of the uplink HARQ of the uplink and downlink configuration 1. Because the PHICHs defined in the release 8 exist in all the subframes of the uplink and downlink configuration 0 or 6, there is no problem of failing to find an available PHICH. Specifically, for the uplink subframe of one scheduled cell, when timing of sending the UL_grant and the PHICH information is determined according to an uplink timing relationship of the uplink and downlink configuration 1, if what in the two pieces of timing of the scheduling cell are downlink subframes, the cross-carrier scheduling may be performed on the uplink subframe of the scheduled cell; otherwise, the cross-carrier scheduling is not supported.

210: Determine whether a downlink subframe corresponding to a first downlink subframe exists in the scheduling cell.

For example, the first downlink subframe used to indicate timing of uplink scheduling grant information of a first uplink subframe of the scheduled cell is determined according to the timing relationship of the uplink HARQ of the reference uplink and downlink configuration, and it is determined whether a subframe of the scheduling cell corresponding to the first downlink subframe is a downlink subframe. If yes, execute 220, otherwise, the cross-carrier scheduling is not supported for the first uplink subframe. Herein, the first uplink subframe refers to an uplink subframe of the scheduled cell.

220: Determine whether a downlink subframe corresponding to a second downlink subframe exists in the scheduling cell.

For example, the second downlink subframe used to indicate timing of the PHICH of the first uplink subframe of the scheduled cell is determined according to the timing relationship of the uplink HARQ of the reference uplink and downlink configuration, and it is determined whether a subframe of the scheduling cell corresponding to the second downlink subframe is the downlink subframe. If yes, execute 230, otherwise, the cross-carrier scheduling is not supported for the first uplink subframe.

230: Determine whether the subframe of the scheduling cell corresponding to the second downlink subframe defines the PHICH.

For example, if the subframe of the scheduling cell corresponding to the second downlink subframe defines the PHICH, execute 240, otherwise, the cross-carrier scheduling is not supported for the first uplink subframe.

240: Determine whether an uplink subframe corresponding to a second uplink subframe exists in the scheduled cell. If yes, the cross-carrier scheduling is performed on the first uplink subframe, otherwise, the cross-carrier scheduling is not supported for the first uplink subframe.

The foregoing describes that the cross-carrier scheduling may be performed on the first uplink subframe of the scheduled cell when conditions in 210 to 240 are met. Optionally, the cross-carrier scheduling may also be performed on the first uplink subframe of the scheduled cell when only conditions in 210 are met, or only conditions in 210 and 220 are met, or only conditions in 210, 220 and 230 are met.

Both a base station and the UE may perform determining in 210 to 240, so as to determine that the cross-carrier scheduling is performed on which uplink subframes. The following 250 to 280 describe a procedure that the cross-carrier scheduling is performed on the first uplink subframe of the scheduled cell.

250: The base station sends the uplink scheduling grant information in the downlink subframe of the scheduling cell corresponding to the first downlink subframe, under a circumstance that it is determined that the cross-carrier scheduling may be performed on the first uplink subframe of the scheduled cell.

260: After receiving the uplink scheduling grant information in the downlink subframe of the scheduling cell corresponding to the first downlink subframe, the UE performs demodulation, and sends the PUSCH in the first uplink subframe of the scheduled cell.

270: After receiving the PUSCH in the first uplink subframe of the scheduled cell, the base station performs the demodulation, and sends to the UE the PHICH information in the downlink subframe of the scheduling cell corresponding to the second downlink subframe.

280: After receiving the PHICH information in the downlink subframe of the scheduling cell corresponding to the second downlink subframe, the UE performs the demodulation, and retransmits the last PUSCH or sends a new PUSCH to the base station in the uplink subframe of the scheduled cell corresponding to the second uplink subframe.

For example, under a circumstance that the subframe of the scheduled cell corresponding to the uplink subframe determined according to the timing relationship of the uplink HARQ of the reference uplink and downlink configuration is the uplink subframe, if information sent by the PHICH is ACK, the UE may send the new PUSCH to the base station in the uplink subframe, and if the information sent by the PHICH is NACK, the UE may retransmit the last PUSCH to the base station in the uplink subframe.

Embodiment 3

Figure 3:
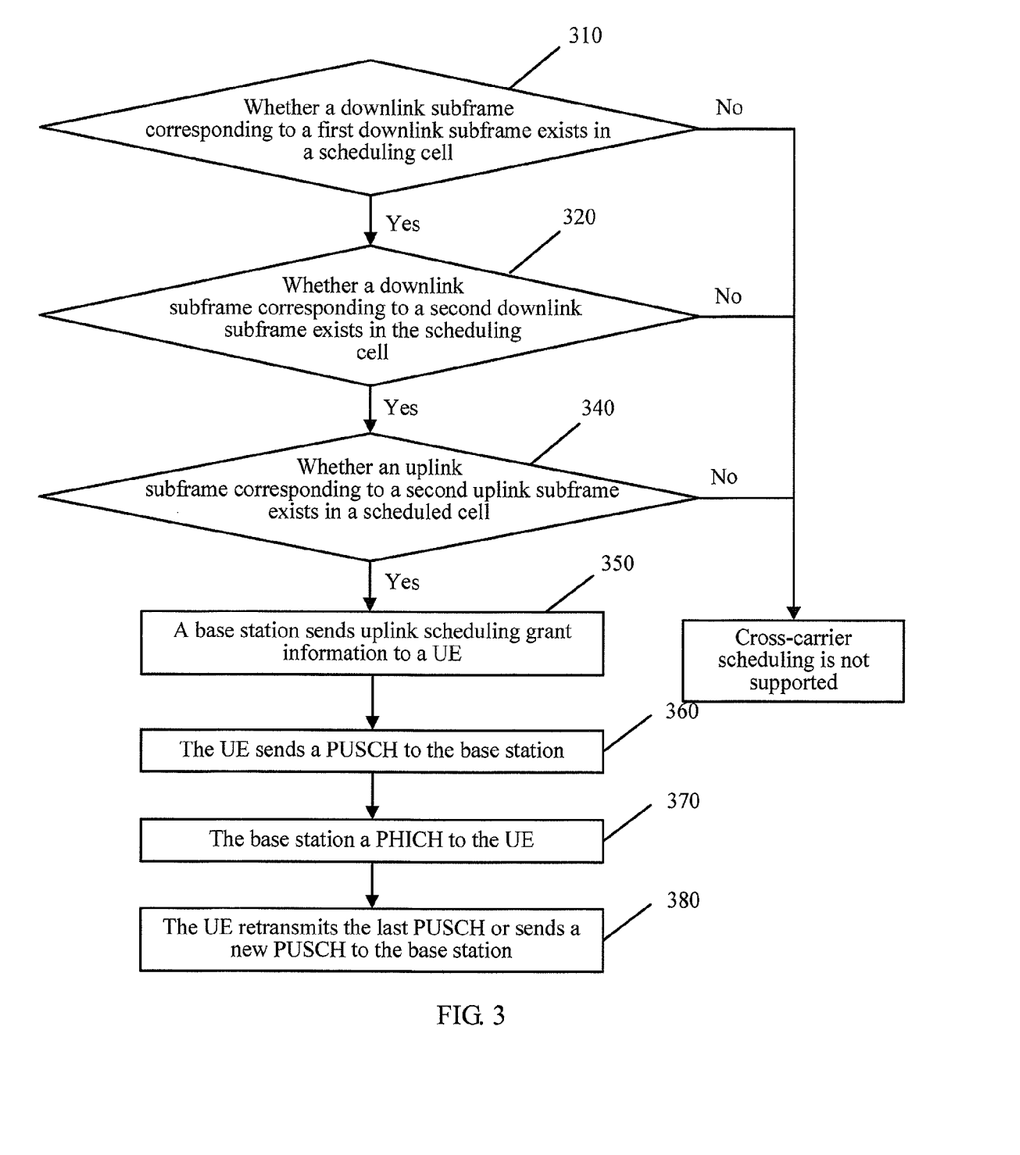
FIG. 3 is a schematic flowchart of a data transmission procedure based on cross-carrier scheduling according to Embodiment 3 of the present invention.

FIG. 3 is a schematic flowchart of a data transmission procedure based on cross-carrier scheduling according to Embodiment 3 of the present invention. Embodiment 3 describes one or more steps in the method of Embodiment 1 in details.

In Embodiment 3, it is not limited that an available PHICH defined in an LTE release 8 definitely exist when synchronous HARQ transmission is performed on a PUSCH of a scheduled cell, so as to support cross-carrier scheduling for uplink subframes of more scheduled cells. For uplink and downlink configurations 0 and 6, whose cycle of synchronous HARQ transmission is not 10 ms, only when the cross-carrier scheduling may be performed on all the uplink subframes of the configurations 0 and 6, it is considered to work according to timing of the uplink and downlink configuration 0 and 6, so as to ensure that a subframe of the scheduled cell in the timing of a second uplink subframe is an uplink subframe.

When a scheduling cell adopts a certain configuration in uplink and downlink configurations 2 to 5, the uplink and downlink configuration of the scheduled cell serves as a reference uplink and downlink configuration, that is, the cross-carrier scheduling is supported for the uplink subframe of the scheduled cell according to timing of an uplink HARQ of the scheduled cell. Specifically, for a circumstance that the scheduled cell adopts configurations 1 to 5, for an uplink subframe of the scheduled cell, timing of sending UL_grant and PHICH information is determined according to an uplink timing relationship of the scheduled cell, if what in timing of the scheduling cell is a downlink subframe, the cross-carrier scheduling may be performed on the uplink subframe of the scheduled cell; otherwise, the cross-carrier scheduling is not supported. Because the cycle of the configurations 1 to 5 is 10 ms, when PUSCH is retransmitted in a synchronous HARQ procedure according to the timing of the uplink HARQ of the configurations 1 to 5, an available uplink subframe definitely exist in retransmission timing. For a circumstance that the scheduled cell adopts the configuration 0 or 6, the downlink subframes of the configuration 0 or 6 are subsets of the downlink subframes of the scheduling cell, therefore, the downlink subframe sending the UL_grant and the PHICH information needs to exist in the scheduling cell according to the timing of the uplink HARQ of the scheduled cell, that is, the cross-carrier scheduling may be performed on all the uplink subframes of the scheduled cells, which ensures that the available uplink subframe definitely exist in the retransmission timing when the synchronous HARQ retransmission is processed according to the timing of the uplink HARQ of the configuration 0 or 6.

In particular, in the LTE release 8, an LTE release 9, and an LTE release 10, for a circumstance that the scheduled cell adopts the uplink and downlink configuration 0, a UL_index field needs to be set in the UL_grant. For a circumstance that the scheduled cell adopts another uplink and downlink configuration, a UL_DAI field is set in the UL_grant. In the LTE release 8, the LTE release 9, and the LTE release 10, two PHICHs (such as, PHICH 0, PHICH 1) respectively exist in a subframe 0 or 5 of the uplink and downlink configuration 0, and are used for different synchronous HARQ procedures. In this case, under a circumstance that different ratios are adopted, when the scheduled cell adopts the uplink and downlink configuration 0, if the PHICH exists in the subframe 0 or 5 of the scheduling cell, the PHICH existing in the subframe 0 or 5 of the scheduling cell may serve as the PHICH 0, that is, the PHICH existing in the subframe 0 or 5 may only be used for the synchronous HARQ procedure using the PHICH 0 according to the LTE release 8; or the PHICH existing in the subframe 0 or 5 may also be used for two synchronous HARQ procedures.

When the scheduling cell adopts uplink and downlink configuration 0, 1, or 6, the uplink and downlink configuration 1 is always adopted to serve as the reference uplink and downlink configuration, that is, the cross-carrier scheduling is performed on the uplink subframe of the scheduled cell according to the timing of the uplink HARQ of the uplink and downlink configuration 1. Specifically, for an uplink subframe of the scheduled cell, the timing of sending the UL_grant and the PHICH information is determined according to the uplink timing relationship of the uplink and downlink configuration 1, if what in the timing of the scheduling cell is a downlink subframe, the cross-carrier scheduling may be performed on the uplink subframe of the scheduled cell; otherwise, the cross-carrier scheduling is not supported. Because the cycle of the uplink and downlink configuration 1 is 10 ms, the synchronous HARQ retransmission is processed according to the uplink and downlink configuration 1, which ensures that the available uplink subframe definitely exist in the retransmission timing.

For a circumstance that the PHICH defined in the LTE release 8 does not exist, the following method may be adopted to support the synchronous HARQ transmission. The PHICH allocated in a method defined in the LTE release 8 may be added to the subframes of the scheduling cell, however, the method may lead to a problem of subsequent compatibility, that is, UEs in the LTE release 8, the LTE release 9, and the LTE release 10 do not learn that the subframe has the PHICH newly allocated according to the method defined in the LTE release 8, thereby resulting in a PDCCH receiving error. Alternatively, other methods may be used to allocate the PHICH, for example, a new PHICH is allocated in time frequency resources where a data channel is located, for example, an enhanced PHICH (ePHICH) channel, because the new PHICH is transmitted in data channel resources, detecting the PDCCH by the UEs in the LTE release 8, the LTE release 9, and the LTE release 10 is not affected, which meets the subsequent compatibility. Alternatively, the PHICH is not allocated to the subframes. Actually, although the PHICH does not exist, the base station may still use the UL_grant to trigger the synchronous HARQ retransmission, and signaling overheads is higher.

310: Determine whether a downlink subframe corresponding to a first downlink subframe exists in the scheduling cell.

For example, the first downlink subframe used to indicate timing of uplink scheduling grant information of a first uplink subframe of the scheduled cell is determined according to the timing relationship of the uplink HARQ of the reference uplink and downlink configuration, and it is determined whether a subframe of the scheduling cell corresponding to the first downlink subframe is a downlink subframe, if yes, execute 320, otherwise, the cross-carrier scheduling is not supported for the first uplink subframe. Herein, the first uplink subframe refers to any uplink subframe of the scheduled cell.

320: Determine whether a downlink subframe corresponding to a second downlink subframe exists in the scheduling cell.

For example, the second downlink subframe used to indicate timing of the PHICH of the first uplink subframe of the scheduled cell is determined according to the timing relationship of the uplink HARQ of the reference uplink and downlink configuration, and it is determined whether a subframe of the scheduling cell corresponding to the second downlink subframe is a downlink subframe. If yes, execute 340, otherwise, the cross-carrier scheduling is not supported for the first uplink subframe.

340: Determine whether an uplink subframe corresponding to a second uplink subframe exists in the scheduled cell. If yes, the cross-carrier scheduling is performed on the first uplink subframe, otherwise, the cross-carrier scheduling is not supported for the first uplink subframe.

The foregoing describes that the cross-carrier scheduling may be performed on the first uplink subframe of the scheduled cell when conditions in 310 to 340 are met. Optionally, the cross-carrier scheduling may also be performed on the first uplink subframe of the scheduled cell when only conditions in 310 are met or only conditions in 310 and 320 are met.

Both the base station and the UE may perform determining in 310 to 340, so as to determine that the cross-carrier scheduling is performed on which uplink subframes. The following 350 to 380 describe a procedure that the cross-carrier scheduling is performed on the first uplink subframe of the scheduled cell.

350: The base station sends the uplink scheduling grant information in the downlink subframe of the scheduling cell corresponding to the first downlink subframe, under a circumstance that it is determined that the cross-carrier scheduling may be performed on the first uplink subframe of the scheduled cell.

360: After receiving the uplink scheduling grant information in the downlink subframe of the scheduling cell corresponding to the first downlink subframe, the UE performs demodulation, and sends the PUSCH in the first uplink subframe of the scheduled cell.

370: After receiving the PUSCH in the first uplink subframe of the scheduled cell, the base station performs the demodulation, and sends to the UE the PHICH information in the downlink subframe of the scheduling cell corresponding to the second downlink subframe.

380: After receiving the PHICH information in the downlink subframe of the scheduling cell corresponding to the second downlink subframe, the UE performs the demodulation, and retransmits the last PUSCH or sends a new PUSCH to the base station in the uplink subframe of the scheduled cell corresponding to the second uplink subframe.

The foregoing describes the data transmission method based on the cross-carrier scheduling according to the embodiment of the present invention, and with reference to FIG. 4 and FIG. 5, a base station, a user equipment, and a system according to the embodiments of the present invention, and corresponding storage mediums and computer program products are separately described in the following.

Embodiment 4

Figure 4:
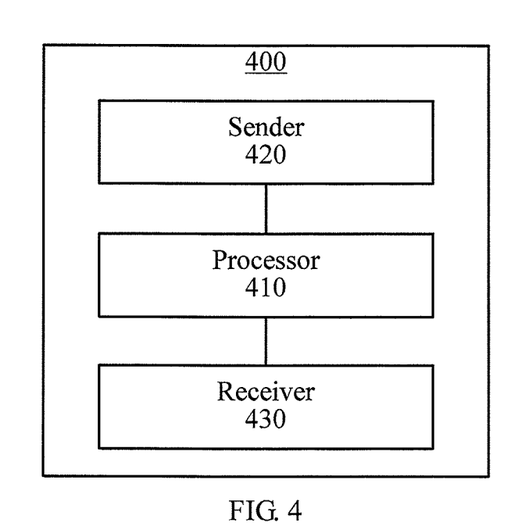
FIG. 4 is a schematic structural diagram of a base station according to an embodiment of the present invention.

FIG. 4 is a schematic structural diagram of a base station according to Embodiment 4 of the present invention. The base station 400 of FIG. 4 includes: a processor 410, a sender 420, and a receiver 430. The embodiment of FIG. 4 describes one or more steps in the method of the embodiment in FIG. 1 in details.

The processor 410 is configured to determine a first downlink subframe according to a timing relationship of an uplink hybrid automatic repeat request HARQ of a reference uplink and downlink configuration, where the first downlink subframe is used to indicate timing of sending uplink scheduling grant information of a first uplink subframe of a scheduled cell.

The sender 420 is configured to send the uplink scheduling grant information in a subframe of a scheduling cell corresponding to the first downlink subframe, under a circumstance that the subframe of the scheduling cell corresponding to the first downlink subframe is a downlink subframe, where an uplink and downlink configuration of the scheduling cell and an uplink and downlink configuration of the scheduled cell are different.

The receiver 430 is configured to receive uplink data sent in the first uplink subframe by a user equipment.

According to the embodiment of the present invention, the reference uplink and downlink configuration allows performing cross-carrier scheduling on at least one uplink subframe of the scheduled cell according to the timing relationship of the uplink HARQ of the reference uplink and downlink configuration.

According to Embodiment 4 of the present invention, the reference uplink and downlink configuration allows performing the cross-carrier scheduling on the at least one uplink subframe of the scheduled cell, under a circumstance that a subframe of the scheduling cell corresponding to a downlink subframe that is used to send uplink scheduling grant information of the at least one uplink subframe and determined according to the timing relationship of the uplink HARQ is a downlink subframe, a subframe of the scheduling cell corresponding to a downlink subframe that is used to send physical hybrid automatic repeat request indicator channel PHICH information and determined according to the timing relationship of the uplink HARQ is a downlink subframe, and a subframe of the scheduled cell corresponding to a downlink subframe that is used to retransmit uplink data of the at least one uplink subframe and determined according to the timing relationship of the uplink HARQ is an uplink subframe.

According to Embodiment 4 of the present invention, the scheduling cell adopts one of uplink and downlink configurations 2 to 5 defined in an LTE release 8, and the uplink and downlink configuration of the scheduled cell serves as the reference uplink and downlink configuration; or the scheduling cell adopts an uplink and downlink configuration 0, an uplink and downlink configuration 1, or an uplink and downlink configuration 6 defined in the LTE release 8, and the uplink and downlink configuration 1 serves as the reference uplink and downlink configuration.

According to Embodiment 4 of the present invention, the scheduling cell adopts one of uplink and downlink configurations 1 to 5 defined in the LTE release 8, and the uplink and downlink configuration of the scheduling cell serves as the reference uplink and downlink configuration; or the scheduling cell adopts the uplink and downlink configuration 0 or the uplink and downlink configuration defined in the LTE release 8, and the uplink and downlink configuration 1 defined in the LTE release 8 serves as the reference uplink and downlink configuration.

Optionally, as a supplement or an exception, the processor 410 is further configured to determine a second downlink subframe according to the timing relationship of the uplink HARQ of the reference uplink and downlink configuration, where the second downlink subframe is used to indicate timing of sending PHICH information of the uplink data, and the sender 420 is further configured to send the PHICH information in a subframe of the scheduling cell corresponding to the second downlink subframe, under a circumstance that the subframe of the scheduling cell corresponding to the second downlink subframe is a downlink subframe, where the sender 420 is further configured to send the uplink scheduling grant information in the subframe of the scheduling cell corresponding to the first downlink subframe, under the circumstance that the subframe of the scheduling cell corresponding to the second downlink subframe is the downlink subframe.

According to the embodiment of the present invention, if a PHICH used for multiple uplink subframes is defined in the second downlink subframe of the reference uplink and downlink configuration, and a PHICH is also defined in the subframe of the scheduling cell corresponding to the second downlink subframe, one of the multiple uplink subframes uses the PHICH defined in the subframe of the scheduling cell, or the multiple uplink subframes use the PHICH defined in the subframe of the scheduling cell.

According to the embodiment of the present invention, the sender 420 is further configured to send the uplink scheduling grant information in the subframe of the scheduling cell corresponding to the first downlink subframe, under a circumstance that the subframe of the scheduling cell corresponding to the second downlink subframe is the downlink subframe and the PHICH is defined.

Optionally, as a supplement or an exception, the processor 410 is further configured to determine a second uplink subframe according to the timing relationship of the uplink HARQ of the reference uplink and downlink configuration, where the second uplink subframe is used to indicate timing of retransmitting the uplink data, and the receiver 430 is further configured to receive, in a subframe of the scheduled cell corresponding to the second uplink subframe, the uplink data retransmitted by a user equipment, under a circumstance that the subframe of the scheduled cell corresponding to the second uplink subframe is an uplink subframe, where the sender 420 is further configured to send the uplink scheduling grant information in the subframe of the scheduling cell corresponding to the first downlink subframe, under the circumstance that the subframe of the scheduled cell corresponding to the second uplink subframe is the uplink subframe.

According to the embodiment of the present invention, the reference uplink and downlink configuration is preconfigured, and the sender 420 is further configured to notify the user equipment of the reference uplink and downlink configuration. For example, the user equipment is notified by using high-layer signaling.

It should be noted that: the processor 410, the sender 420, and the receiver 430 are coupled with each other.

For operation executed by each piece of hardware or a combination of hardware and corresponding software of the base station 400, reference may be made to the corresponding methods of Embodiment 1 to Embodiment 3, for example, 110, 120, and 130 of the method of Embodiment 1. To avoid repetition, description is not given again herein.

In addition, a computer readable media (or medium) is further provided, which includes computer readable instructions that are executed to perform the following operations executing the operations of 110, 120, and 130 of the method of Embodiment 1.

In addition, a computer program product is further provided, which includes the foregoing computer readable medium.

Embodiment 5

Figure 5:
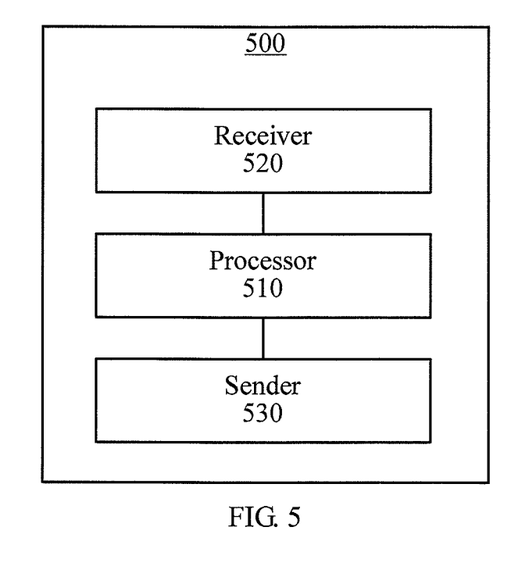
FIG. 5 is a schematic structural diagram of a user equipment according to an embodiment of the present invention.

FIG. 5 is a schematic structural diagram of a user equipment 500 according to Embodiment 5 of the present invention. The user equipment 500 of FIG. 5 includes: a processor 510, a receiver 520, and a sender 530.

The processor 510 is configured to determine a first downlink subframe according to a timing relationship of an uplink hybrid automatic repeat request HARQ of a reference uplink and downlink configuration, where the first downlink subframe is used to indicate timing of sending uplink scheduling grant information of a first uplink subframe of a scheduled cell. The receiver 520 is configured to receive the uplink scheduling grant information in a subframe of a scheduling cell corresponding to the first downlink subframe, under a circumstance that the subframe of the scheduling cell corresponding to the first downlink subframe is a downlink subframe, where an uplink and downlink configuration of the scheduling cell and an uplink and downlink configuration of the scheduled cell are different. The sender 530 is configured to send uplink data in the first uplink subframe according to the uplink scheduling grant information.

According to Embodiment 5 of the present invention, the reference uplink and downlink configuration allows performing cross-carrier scheduling on at least one uplink subframe of the scheduled cell according to the timing relationship of the uplink HARQ of the reference uplink and downlink configuration.

The reference uplink and downlink configuration allows performing the cross-carrier scheduling on the at least one uplink subframe of the scheduled cell, under a circumstance that a subframe of the scheduling cell corresponding to a downlink subframe that is used to send uplink scheduling grant information of the at least one uplink subframe and determined according to the timing relationship of the uplink HARQ is a downlink subframe, a subframe of the scheduling cell corresponding to a downlink subframe that is used to send physical hybrid automatic repeat request indicator channel PHICH information and determined according to the timing relationship of the uplink HARQ is a downlink subframe, and a subframe of the scheduled cell corresponding to a downlink subframe that is used to retransmit uplink data of the at least one uplink subframe and determined according to the timing relationship of the uplink HARQ is an uplink subframe.

According to Embodiment 5 of the present invention, the scheduling cell adopts one of uplink and downlink configurations 2 to 5 defined in an LTE release 8, and the uplink and downlink configuration of the scheduled cell serves as the reference uplink and downlink configuration; or the scheduling cell adopts an uplink and downlink configuration 0, an uplink and downlink configuration 1, or an uplink and downlink configuration 6 defined in the LTE release 8, and the uplink and downlink configuration 1 serves as the reference uplink and downlink configuration.

According to Embodiment 5 of the present invention, the scheduling cell adopts one of uplink and downlink configuration 1 to 5 defined in the LTE release 8, and the uplink and downlink configuration of the scheduling cell serves as the reference uplink and downlink configuration; or the scheduling cell adopts the uplink and downlink configuration 0 or the uplink and downlink configuration defined in the LTE release 8, and the uplink and downlink configuration 1 defined in the LTE release 8 serves as the reference uplink and downlink configuration.

Optionally, as a supplement or an exception, the processor 510 is further configured to determine a second downlink subframe according to the timing relationship of the uplink HARQ of the reference uplink and downlink configuration, where the second downlink subframe is used to indicate timing of sending the PHICH information of the uplink data, and the receiver 520 is further configured to receive the PHICH information in a subframe of the scheduling cell corresponding to the second downlink subframe, under a circumstance that the subframe of the scheduling cell corresponding to the second downlink subframe is a downlink subframe, where the receiver 520 is further configured to receive the uplink scheduling grant information in the subframe of the scheduling cell corresponding to the first downlink subframe, under the circumstance that the subframe of the scheduling cell corresponding to the second downlink subframe is the downlink subframe.

According to Embodiment 5 of the present invention, if a PHICH used for multiple uplink subframes is defined in the second downlink subframe of the reference uplink and downlink configuration, and a PHICH is also defined in the subframe of the scheduling cell corresponding to the second downlink subframe, one of the multiple uplink subframes uses the PHICH defined in the subframe of the scheduling cell, or the multiple uplink subframes use the PHICH defined in the subframe of the scheduling cell.

According to the embodiment of the present invention, the receiver 520 is further configured to receive the uplink scheduling grant information in the subframe of the scheduling cell corresponding to the first downlink subframe, under a circumstance that the subframe of the scheduling cell corresponding to the second downlink subframe is the downlink subframe and the PHICH is defined.

Optionally, as a supplement or an exception, the processor 510 is further configured to determine a second uplink subframe according to the timing relationship of the uplink HARQ of the reference uplink and downlink configuration, where the second uplink subframe is used to indicate timing of retransmitting the uplink data, and the sender 530 is further configured to retransmit the uplink data in a subframe of the scheduled cell corresponding to the second uplink subframe, under a circumstance that the subframe of the scheduled cell corresponding to the second uplink subframe is an uplink subframe, where the receiver 520 is further configured to receive the uplink scheduling grant information in the subframe of the scheduling cell corresponding to the first downlink subframe, under the circumstance that the subframe of the scheduled cell corresponding to the second uplink subframe is the uplink subframe.

According to the embodiment of the present invention, the receiver 520 receives the reference uplink and downlink configuration from a base station, or the reference uplink and downlink configuration is preconfigured.

It should be noted that: the processor 510, the receiver 520, and the sender 530 are coupled with each other.

For operation executed by each piece of hardware or a combination of hardware and corresponding software of the user equipment 500, reference may be made to the corresponding methods of Embodiment 1 to Embodiment 3, for example, 110, 120, and 130 of the method in Embodiment 1. To avoid repetition, description is not given again herein.

In addition, a computer readable media (or medium) is further provided, which includes computer readable instructions that are executed to perform the following operation: executing the operation of the 110, 120, and 130 of the method in Embodiment 1.

In addition, a computer program product is further provided, which includes the foregoing computer readable medium.

According to the embodiment of the present invention, a communications system is provided, which includes the base station 400 in the embodiment of FIG. 4 and the user equipment 500 in the embodiment of FIG. 5.

A person of ordinary skill in the art may be aware that, in combination with the examples described in the embodiments disclosed in this specification, components and algorithm steps may be implemented by electronic hardware, or a combination of computer software and electronic hardware. Whether the functions are performed by hardware or software depends on the particular applications and design constraint conditions of the technical solution. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and component, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the component division is merely logical function division and may be other division in actual implementation. For example, a plurality of components or components may be combined or integrated into another system, or some features may be ignored or not performed. In addition, the displayed or discussed mutual couplings or direct couplings or communication connections may be implemented through some interfaces. The indirect couplings or communication connections between the apparatuses or components may be implemented in electronic, mechanical, or other forms.

The components described as separate parts may or may not be physically separate, and the parts displayed as components may or may not be physical components, may be located in one position, or may be distributed on a plurality of network components. Some or all of the components may be selected to achieve the objective of the solution of the embodiment according to actual needs.

In addition, function components in the embodiments of the present invention may be integrated into a processing component, or each of the components may exist alone physically, or two or more components are integrated into a component.

When the functions are implemented in a form of a software functional component and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The computer software product is stored in a storage medium, and includes several instructions for instructing a computer device (which may be a personal computer, a server, or a network device) to perform all or a part of the steps of the methods described in the embodiment of the present invention. The foregoing storage medium includes: any medium that can store program code, such as a USB flash drive, a removable hard disk, a read-only memory (Read-Only Memory, ROM), a random access memory (Random Access Memory, RAM), a magnetic disk, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the appended claims.

What is claimed is:

1. A data transmission method based on cross-carrier scheduling, the method comprising:
   determining a first downlink subframe according to a timing relationship of an uplink hybrid automatic repeat request (HARQ) of a reference uplink and downlink configuration, wherein the first downlink subframe is used to indicate timing of sending uplink scheduling grant information of a first uplink subframe of a scheduled cell, the reference uplink and downlink configuration allows performing the cross-carrier scheduling on the at least one uplink subframe of the scheduled cell, under a circumstance that a subframe of the scheduling cell corresponding to a downlink subframe that is used to send uplink scheduling grant information of the at least one uplink subframe and determined according to the timing relationship of the uplink HARQ is a downlink subframe, a subframe of the scheduling cell corresponding to a downlink subframe that is used to send physical hybrid automatic repeat request indicator channel (PHICH) information and determined according to the timing relationship of the uplink HARQ is a downlink subframe, and a subframe of the scheduled cell corresponding to a downlink subframe that is used to retransmit uplink data of the at least one uplink subframe and determined according to the timing relationship of the uplink HARQ is an uplink subframe;

transmitting the uplink scheduling grant information in a subframe of a scheduling cell corresponding to the first downlink subframe, under a circumstance that the subframe of the scheduling cell corresponding to the first downlink subframe is a downlink subframe, wherein an uplink and downlink configuration of the scheduling cell and an uplink and downlink configuration of the scheduled cell are different, wherein when the scheduling cell adopts one of uplink and downlink configurations 2 to 5 defined in a Long Term Evolution (LTE) release 8, the uplink and downlink configuration of the scheduled cell serves as the reference uplink and downlink configuration; or when the scheduling cell adopts an uplink and downlink configuration 0, an uplink and downlink configuration 1, or an uplink and downlink configuration 6 defined in the LTE release 8, the uplink and downlink configuration 1 defined in the LTE release 8 serves as the reference uplink and downlink configuration; and transmitting uplink data in the first uplink subframe.

2. The method according to claim 1, further comprising:
determining a second downlink subframe according to the timing relationship of the uplink HARQ of the reference uplink and downlink configuration, wherein the second downlink subframe is used to indicate timing of transmitting physical hybrid automatic repeat request indicator channel (PHICH) information of the uplink data; and transmitting the PHICH information in a subframe of the scheduling cell corresponding to the second downlink subframe, under a circumstance that the subframe of the scheduling cell corresponding to the second downlink subframe is a downlink subframe, wherein transmitting the uplink scheduling grant information in a subframe of a scheduling cell corresponding to the first downlink subframe comprises:
transmitting the uplink scheduling grant information in the subframe of the scheduling cell corresponding to the first downlink subframe, under the circumstance that the subframe of the scheduling cell corresponding to the second downlink subframe is the downlink subframe.

3. The method according to claim 2, wherein if a PHICH used for multiple uplink subframes is defined in the second downlink subframe of the reference uplink and downlink configuration, and a PHICH is also defined in the subframe of the scheduling cell corresponding to the second downlink subframe, one of the multiple uplink subframes uses the PHICH defined in the subframe of the scheduling cell, or the multiple uplink subframes use the PHICH defined in the subframe of the scheduling cell.

4. The method according to claim 2, wherein transmitting the uplink scheduling grant information in a subframe of a scheduling cell corresponding to the first downlink subframe comprises:
transmitting the uplink scheduling grant information in the subframe of the scheduling cell corresponding to the first downlink subframe, under a circumstance that the subframe of the scheduling cell corresponding to the second downlink subframe is the downlink subframe and a PHICH is defined.

5. The method according to claim 1, further comprising:
determining a second uplink subframe according to the timing relationship of the uplink HARQ of the reference uplink and downlink configuration, wherein the second uplink subframe is used to indicate timing of retransmitting the uplink data; and retransmitting the uplink data in a subframe of the scheduled cell corresponding to the second uplink subframe, under a circumstance that the subframe of the scheduled cell corresponding to the second uplink subframe is an uplink subframe, wherein transmitting the uplink scheduling grant information in a subframe of a scheduling cell corresponding to the first downlink subframe comprises:
transmitting the uplink scheduling grant information in the subframe of the scheduling cell corresponding to the first downlink subframe, under the circumstance that the subframe of the scheduled cell corresponding to the second uplink subframe is the uplink subframe.

6. The method according to claim 1, wherein the reference uplink and downlink configuration is notified by using high-layer signaling, or the reference uplink and downlink configuration is preconfigured.

7. A base station, comprising:
a processor, configured to determine a first downlink subframe according to a timing relationship of an uplink hybrid automatic repeat request (HARQ) of a reference uplink and downlink configuration, wherein the first downlink subframe is used to indicate timing of sending uplink scheduling grant information of a first uplink subframe of a scheduled cell, wherein the reference uplink and downlink configuration allows performing the cross-carrier scheduling on the at least one uplink subframe of the scheduled cell, under a circumstance that a subframe of the scheduling cell corresponding to a downlink subframe that is used to send uplink scheduling grant information of the at least one uplink subframe and determined according to the timing relationship of the uplink HARQ is a downlink subframe, a subframe of the scheduling cell corresponding to a downlink subframe that is used to send physical hybrid automatic repeat request indicator channel PHICH information and determined according to the timing relationship of the uplink HARQ is a downlink subframe, and a subframe of the scheduled cell corresponding to a downlink subframe that is used to retransmit uplink data of the at least one uplink subframe and determined according to the timing relationship of the uplink HARQ is an uplink subframe;
a transmitter, configured to send the uplink scheduling grant information in a subframe of a scheduling cell corresponding to the first downlink subframe, under a circumstance that the subframe of the scheduling cell corresponding to the first downlink subframe is a downlink subframe, wherein an uplink and downlink configuration of the scheduling cell and an uplink and downlink configuration of the scheduled cell are different, wherein when the scheduling cell adopts one of uplink and downlink configurations 2 to 5 defined in a Long Term Evolution (LTE) release 8, the uplink and downlink configuration of the scheduled cell serves as the reference uplink and downlink configuration; or when the scheduling cell adopts an uplink and downlink configuration 0, an uplink and downlink configuration 1, or an uplink and downlink configuration 6 defined in the LTE release 8, the uplink and downlink configuration 1 defined in the LTE release 8 serves as the reference uplink and downlink configuration; and a receiver, configured to receive uplink data sent in the first uplink subframe by a user equipment.

8. The base station according to claim 7, wherein the processor is further configured to determine a second downlink subframe according to the timing relationship of the uplink HARQ of the reference uplink and downlink configuration, wherein the second downlink subframe is used to indicate timing of sending physical hybrid automatic repeat request indicator channel (PHICH) information of the uplink data, and the transmitter is further configured to send the PHICH information in a subframe of the scheduling cell corresponding to the second downlink subframe, under a circumstance that the subframe of the scheduling cell corresponding to the second downlink subframe is a downlink subframe, wherein the transmitter is further configured to send the uplink scheduling grant information in the subframe of the scheduling cell corresponding to the first downlink subframe, under the circumstance that the subframe of the scheduling cell corresponding to the second downlink subframe is the downlink subframe.

9. The base station according to claim 8, wherein the transmitter is further configured to send the uplink scheduling grant information in the subframe of the scheduling cell corresponding to the first downlink subframe, under a circumstance that the subframe of the scheduling cell corresponding to the second downlink subframe is the downlink subframe and a PHICH is defined.

10. The base station according to claim 7, wherein the processor is further configured to determine a second uplink subframe according to the timing relationship of the uplink HARQ of the reference uplink and downlink configuration, wherein the second uplink subframe is used to indicate timing of retransmitting the uplink data, and the receiver is further configured to receive, in a subframe of the scheduled cell corresponding to the second uplink subframe, the uplink data retransmitted by a user equipment, under a circumstance that the subframe of the scheduled cell corresponding to the second uplink subframe is an uplink subframe, wherein the transmitter is further configured to send the uplink scheduling grant information in the subframe of the scheduling cell corresponding to the first downlink subframe, under the circumstance that the subframe of the scheduled cell corresponding to the second uplink subframe is the uplink subframe.

11. A user equipment, comprising:

a processor, configured to determine a first downlink subframe according to a timing relationship of an uplink hybrid automatic repeat request (HARQ) of a reference uplink and downlink configuration, wherein the first downlink subframe is used to indicate timing of sending uplink scheduling grant information of a first uplink subframe of a scheduled cell, wherein the reference uplink and downlink configuration allows performing the cross-carrier scheduling in the at least one uplink subframe of the scheduled cell, under a circumstance that a subframe of the scheduling cell corresponding to a downlink subframe that is used to send uplink scheduling grant information of the at least one uplink subframe and determined according to the timing relationship of the uplink HARQ is a downlink subframe, a subframe of the scheduling cell corresponding to a downlink subframe that is used to send physical hybrid automatic repeat request indicator channel (PHICH) information and determined according to the timing relationship of the uplink HARQ is a downlink subframe, and a subframe of the scheduled cell corresponding to a downlink subframe that is used to retransmit uplink data of the at least one uplink subframe and determined according to the timing relationship of the uplink HARQ is an uplink subframe;

a receiver, configured to receive the uplink scheduling grant information in a subframe of a scheduling cell corresponding to the first downlink subframe, under a circumstance that the subframe of the scheduling cell corresponding to the first downlink subframe is a downlink subframe, wherein an uplink and downlink configuration of the scheduling cell and an uplink and downlink configuration of the scheduled cell are different, wherein when the scheduling cell adopts one of uplink and downlink configurations 2 to 5 defined in a Long Term Evolution (LTE) release 8, and the uplink and downlink configuration of the scheduled cell serves as the reference uplink and downlink configuration; or when the scheduling cell adopts an uplink and downlink configuration 0, an uplink and downlink configuration 1, or an uplink and downlink configuration 6 defined in the LTE release 8, the uplink and downlink configuration 1 defined in the LTE release 8 serves as the reference uplink and downlink configuration; and a transmitter, configured to send uplink data in the first uplink subframe according to the uplink scheduling grant information.

12. The user equipment according to claim 11, wherein the processor is further configured to determine a second downlink subframe according to the timing relationship of the uplink HARQ of the reference uplink and downlink configuration, wherein the second downlink subframe is used to indicate timing of receiving physical hybrid automatic repeat request indicator channel PHICH information of the uplink data, and the receiver is further configured to receive the PHICH information in a subframe of the scheduling cell corresponding to the second downlink subframe, under a circumstance that the subframe of the scheduling cell corresponding to the second downlink subframe is a downlink subframe, wherein the receiver is further configured to receive the uplink scheduling grant information in the subframe of the scheduling cell corresponding to the first downlink subframe, under the circumstance that the subframe of the scheduling cell corresponding to the second downlink subframe is the downlink subframe.

13. The user equipment according to claim 12, wherein the receiver is further configured to receive the uplink scheduling grant information in the subframe of the scheduling cell corresponding to the first downlink subframe, under a circumstance that the subframe of the scheduling cell corresponding to the second downlink subframe is the downlink subframe and a PHICH is defined.

14. The user equipment according to claim 11, wherein the processor is further configured to determine a second uplink subframe according to the timing relationship of the uplink HARQ of the reference uplink and downlink configuration, wherein the second uplink subframe is used to indicate timing of retransmitting the uplink data, and the transmitter is further configured to retransmit the uplink data in a subframe of the scheduled cell corresponding to the second uplink subframe, under a circumstance that the subframe of the scheduled cell corresponding to the second uplink subframe is an uplink subframe, wherein the receiver is further configured to receive the uplink scheduling grant information in the subframe of the scheduling cell corresponding to the first downlink subframe, under the circumstance that the subframe of the scheduled cell corresponding to the second uplink subframe is the uplink subframe.

15. A non-transitory readable medium, comprising:
computer readable instructions that are executed to perform the following operation, wherein the operation comprises:
determining a first downlink subframe according to a timing relationship of an uplink hybrid automatic repeat request (HARQ) of a reference uplink and downlink configuration, wherein the first downlink subframe is used to indicate timing of sending uplink scheduling grant information of a first uplink subframe of a scheduled cell, the reference uplink and downlink configuration allows performing the cross-carrier scheduling on the at least one uplink subframe of the scheduled cell, under a circumstance that a subframe of the scheduling cell corresponding to a downlink subframe that is used to send uplink scheduling grant information of the at least one uplink subframe and determined according to the timing relationship of the uplink HARQ is a downlink subframe, a subframe of the scheduling cell corresponding to a downlink subframe that is used to send physical hybrid automatic repeat request indicator channel (PHICH) information and determined according to the timing relationship of the uplink HARQ is a downlink subframe, and a subframe of the scheduled cell corresponding to a downlink subframe that is used to retransmit uplink data of the at least one uplink subframe and determined according to the timing relationship of the uplink HARQ is an uplink subframe;
transmitting the uplink scheduling grant information in a subframe of a scheduling cell corresponding to the first downlink subframe, under a circumstance that the subframe of the scheduling cell corresponding to the first downlink subframe is a downlink subframe, wherein an uplink and downlink configuration of the scheduling cell and an uplink and downlink configuration of the scheduled cell are different, wherein when the scheduling cell adopts one of uplink and downlink configurations 2 to 5 defined in a Long Term Evolution (LTE) release 8, the uplink and downlink configuration of the scheduled cell serves as the reference uplink and downlink configuration; or when the scheduling cell adopts an uplink and downlink configuration 0, an uplink and downlink configuration 1, or an uplink and downlink configuration 6 defined in the LTE release 8, the uplink and downlink configuration 1 defined in the LTE release 8 serves as the reference uplink and downlink configuration; and
transmitting uplink data in the first uplink subframe.

16. The non-transitory readable medium according to claim 15, wherein the operation further comprises:
determining a second downlink subframe according to the timing relationship of the uplink HARQ of the reference uplink and downlink configuration, wherein the second downlink subframe is used to indicate timing of transmitting physical hybrid automatic repeat request indicator channel PHICH information of the uplink data; and
transmitting the PHICH information in a subframe of the scheduling cell corresponding to the second downlink subframe, under a circumstance that the subframe of the scheduling cell corresponding to the second downlink subframe is a downlink subframe,
wherein transmitting the uplink scheduling grant information in a subframe of a scheduling cell corresponding to the first downlink subframe comprises:
transmitting the uplink scheduling grant information in the subframe of the scheduling cell corresponding to the first downlink subframe, under the circumstance that the subframe of the scheduling cell corresponding to the second downlink subframe is the downlink subframe.

17. The non-transitory readable medium according to claim 16, wherein
if a PHICH used for multiple uplink subframes is defined in the second downlink subframe of the reference uplink and downlink configuration, and a PHICH is also defined in the subframe of the scheduling cell corresponding to the second downlink subframe, one of the multiple uplink subframes uses the PHICH defined in the subframe of the scheduling cell, or the multiple uplink subframes use the PHICH defined in the subframe of the scheduling cell.

18. The non-transitory readable medium according to claim 16, wherein transmitting the uplink scheduling grant information in a subframe of a scheduling cell corresponding to the first downlink subframe comprises:
transmitting the uplink scheduling grant information in the subframe of the scheduling cell corresponding to the first downlink subframe, under a circumstance that the subframe of the scheduling cell corresponding to the second downlink subframe is the downlink subframe and a PHICH is defined.

19. The non-transitory readable medium according to claim 15, wherein the operation further comprises:
determining a second uplink subframe according to the timing relationship of the uplink HARQ of the reference uplink and downlink configuration, wherein the second uplink subframe is used to indicate timing of retransmitting the uplink data; and
retransmitting the uplink data in a subframe of the scheduled cell corresponding to the second uplink subframe, under a circumstance that the subframe of the scheduled cell corresponding to the second uplink subframe is an uplink subframe,
wherein transmitting the uplink scheduling grant information in a subframe of a scheduling cell corresponding to the first downlink subframe comprises:
transmitting the uplink scheduling grant information in the subframe of the scheduling cell corresponding to the first downlink subframe, under the circumstance that the subframe of the scheduled cell corresponding to the second uplink subframe is the uplink subframe.

* * * * *